(12) United States Patent
Yamato et al.

(10) Patent No.: US 7,704,437 B2
(45) Date of Patent: Apr. 27, 2010

(54) APPLICATOR FOR COSMETICS

(75) Inventors: Yuichi Yamato, Hiroshima-ken (JP); Kenji Kurisu, Hiroshima-ken (JP)

(73) Assignee: Nishikawa Rubber Co., Ltd., Hiroshima-ken (JP)

( * ) Notice: Subject to any disclaimer, the term of this patent is extended or adjusted under 35 U.S.C. 154(b) by 0 days.

(21) Appl. No.: 12/229,844

(22) Filed: Aug. 27, 2008

(65) Prior Publication Data
US 2009/0008829 A1 Jan. 8, 2009

Related U.S. Application Data

(62) Division of application No. 10/786,216, filed on Feb. 25, 2004, now abandoned.

(30) Foreign Application Priority Data

| Feb. 26, 2003 | (JP) | ............................. 2003-048851 |
| Mar. 26, 2003 | (JP) | ............................. 2003-084614 |
| Dec. 24, 2003 | (JP) | ............................. 2003-426657 |
| Dec. 25, 2003 | (JP) | ............................. 2003-430054 |

(51) Int. Cl.
*H05B 6/64* (2006.01)
*B29C 45/12* (2006.01)
*B29C 31/00* (2006.01)
*C08J 9/00* (2006.01)

(52) U.S. Cl. ..................... 264/420; 264/45.3; 264/45.9; 264/46.1; 264/46.2; 264/46.3; 264/54; 264/151; 264/210.2; 264/415; 264/417; 264/474; 264/489; 264/495; 521/79

(58) Field of Classification Search .................. 264/151, 264/210, 211.12
See application file for complete search history.

(56) References Cited

U.S. PATENT DOCUMENTS 4,983,685 A * 1/1991 Aoshima et al. ......... 525/331.8
5,859,076 A * 1/1999 Kozma et al. ................. 521/79

FOREIGN PATENT DOCUMENTS

JP         61073607 A   *   4/1986

* cited by examiner

*Primary Examiner*—Jeffrey Wollschlager
(74) *Attorney, Agent, or Firm*—Flynn, Thiel, Boutell & Tanis, P.C.

(57) ABSTRACT

A compounded rubber, which is made up of an NBR polymer, an organic peroxide and a blowing agent, to which 1 to 100 parts by weight of a synthetic silicic acid serving as a reinforcing filler and 10 to 200 parts by weight of precipitated calcium carbonate having a prismatic particle shape and serving as a filler are added to 100 parts by weight of the NBR polymer, is extrusion molded by a continuous extruder, and heated by HA heating and UHF heating in combination throughout the rubber to cause vulcanization and expansion, thereby providing a thick sponge having a homogenous cell structure. The sponge is passed through press rolls, and the resulting sheet stock is cut or punched with a cutting or punching machine into pieces of a desired form to obtain an applicator for cosmetics.

6 Claims, 3 Drawing Sheets

APPLICATOR FOR COSMETICS

This is a division of Ser. No. 10/786,216, filed Feb. 25, 2004 now abandoned.

BACKGROUND OF THE INVENTION

1. Field of the Invention

This invention relates to an applicator for cosmetics which is adapted for use in the application of cosmetics or skin lotions to human skin surfaces.

The term "an applicator for cosmetics" used herein is intended to mean those instruments which are used for applying cosmetics or skin lotions to human skin surfaces, and include sponge puffs for cosmetics, eye shadow chips, putting sponges, applicators for rouge, applicators or brushes for cheek rouge and the like.

2. Description of the Related Art

At present, foamed rubber materials that are ordinarily used for this type of applicator, particularly, a sponge puff for cosmetic purposes, include acrylonitrile-butadiene rubber (NBR), ethylene-propylene-diene terpolymers (EPDM), urethane rubbers, silicone rubbers and the like.

For the method of obtaining a foamed rubber material of a high degree of foaming or expansion used for sponge puffs for cosmetics, there are known a number of methods including a method wherein a blend of a rubber, a blowing agent, a crosslinking agent and the like is packed in a mold, heated under pressure, followed by depressurization to obtain a foamed material, a method wherein a crosslinking agent is added to a rubber latex, followed by mechanically agitating the mixture for foaming, pouring the mixture into a mold and heating, and the like. However, all of these methods are disadvantageous in that because they are a batch process, their productivity is poor.

For a sponge puff, there is known a latex foam puff, which is obtained by mechanically foaming and vulcanizing a rubber latex composition. This puff has the problem that a limitation is placed on an open-cell foam and a great number of cylindrical molds similar to a product shape are required.

Some closed-cell sponge puffs are also known, which are made of expanded materials obtained by adding a blowing agent and the like additives to a solid rubber, packing the mixture in a mold, and heating under pressure to obtain a sponge material. The rubber sheet removed from the mold should be punched out in a form similar to an intended shape of the product, with the attendant problems of a great loss of the material and poor productivity resulting from its batch process.

Further, urethane sponge puffs are known in the art, wherein a solvent-containing urethane resin composition is extruded, and the solvent is evaporated off under a reduced pressure to form cells therein. This process also has the problems that the material loss is great and a load on recovery of the solvent is serious.

Composite puff articles of latex foam puffs, closed-cell sponge puffs, urethane sponge puffs and puffs made of other types of materials are also known, with the problems that molding of a multi-layered structure is difficult, coupled with an increasing number of additional steps including post-treatment.

A foundation, which is a kind of cosmetic, is classified into a powder-type and a liquid-type. The powder foundation is one wherein pigments and the like are solidified with a paraffin oil or the like, and the liquid foundation is a liquid one wherein solid matters such as pigments are dispersed in water or a silicone oil.

In general, the sponge puff used for the powder foundation is made of an open-cell foam of NBR (nitrile rubber) or a urethane rubber. Especially, an NBR open-cell foam is one which is obtained by mechanically mixing air into a latex and foaming the mixture and whose foamed conditions are uniform throughout the resulting foam with a water absorption being at 500% or over. When this open-cell sponge puff is applied for a liquid-type foundation, the foundation infiltrates into the puff, which makes it difficult to permit the liquid foundation to be deposited on the skin. Thus, such an open-cell sponge puff is unsuitable for a liquid foundation.

Sponge puffs adapted for use in liquid foundations include those sponge puffs made of closed cells such as of silicone rubbers and EPDM (ethylene/propylene rubbers), sponge puffs wherein a skin film is applied onto open-cell sponges, and the like. The closed-cell sponge puffs are those which are expanded under heat and pressurizing conditions with the use of a press and are made of fine foams having a size of 100 µm or below and which cannot be manufactured in a sheet thickness of 30 mm or over because of the application of heat from a hot press. Although the water absorption is less than 5%, this type of puff is not good, with respect to a feel to the touch, owing to the elastic feeling inherent to the closed cells. When this type of puff is applied for powder foundation, it is unlikely to cause a powder foundation to be appropriately deposited thereon due to the fineness of the cells and such a puff runs as sliding on the skin surface, thus being not suited for application to powder foundations in practice.

Those sponge puffs used for liquid-type foundation, in which a skin film is attached to open-cell sponges, are made by attaching a skin film to a latex foam, so that the cells partly collapse. The liquid infiltrates in use from the skin film-free side surface. This presents the problems that hands are soiled, the liquid remains inside, thus lacking in sanitation, and the skin film portion becomes stiff and slippery.

SUMMARY OF THE INVENTION

It is an object of the invention to provide an applicator for cosmetics which is made by a continuous procedure of extrusion, crosslinking and foaming, thus being excellent in productivity.

It is another object of the invention to provide an applicator for cosmetics which can be used to apply both powder and liquid foundations.

According to a first embodiment of the invention, there is provided an applicator for cosmetics which comprises an applicator body obtained by subjecting a compounded rubber to extrusion molding in a given shape to provide a molded rubber, and heating a given shape of the molded rubber to cause vulcanization or crosslinkage therein, and punching and/or cutting the vulcanized or crosslinked rubber into pieces of a given shape.

According to a second embodiment of the invention, it is preferred in the first embodiment that the compounded rubber be made of at least two types of compounded rubbers, which are extrusion molded into plural layers integrally combined together.

According to a third embodiment of the invention, the compounded rubber set forth in the first and second embodiments is made mainly of a polymer having a polar group.

According to a fourth embodiment of the invention, the polar group-bearing polymer set forth in the third embodiment consists of NBR wherein the content of acrylonitrile in the NBR polymer is not larger than 30%.

According to a fifth embodiment of the invention, the compounded rubber is subjected to extrusion molding in a given shape and heated by irradiation with microwaves in any one of the first to fourth embodiments.

According to a sixth embodiment of the invention, the applicator set forth in any one of the first to fifth embodiments is a sponge puff for cosmetics.

The rubber composition using the polar group-bearing polymer as one of the starting materials according to the third embodiment should preferably comprise: (A) 100 parts by weight of a polymer containing from 30 to 100 wt % of the polar group-bearing polymer; (B) 1 to 30 parts by weight of an organic blowing agent; and (C) 0.1 to 5 parts by weight of sulfur or/and 0.1 to 10 parts by weight of an organic peroxide, both serving as a crosslinking agent, wherein when the organic peroxide is used, the relation between decomposition temperature $T_1$ and one minute half life temperature $T_2$ is such that $-20°C. \leqq (T_1-T_2) \leqq +30°C$.

The polar group-bearing polymer in the polymer (A) should preferably be made of NBR. The decomposition temperature $T_1$ of the organic blowing agent (B) should preferably be at 100 to 210° C. The crosslinking agent is preferably made of an organic peroxide from the standpoint of its resistance to metal ions. In this case, the one minute half time temperature $T_2$ is preferably at 100 to 210° C.

The polymer (A) contains 30 to 100 wt %, preferably from 50 to 100 wt %, of the polar group-bearing polymer based on the total amount of the polymer (A). If the amount is smaller than 30 wt %, satisfactory generation of heat with a microwave cannot be obtained, not resulting in uniform and satisfactory degrees of expansion and crosslinkage. It will be noted that no limitation is placed on the types of polymers other than the polar group-bearing polymer.

The polar group-bearing polymer should be one having a polar group in the molecule. Examples of the polar group include functional groups having an oxygen atom, a nitrogen atom or a sulfur atom, such as a cyano group, an amino group, a carboxyl group, an amido group, an acetyl group, an ester group, a sulfone group, a mercapto group and the like.

For the polymers having such polar groups, mention is made, for example, of acrylonitrile-butadiene-styrene copolymers, acryl rubbers, ethylene-vinyl acetate copolymers, ethylene-acrylic acid copolymers, ethylene-acrylic ester copolymers, ethylene-methacrylic ester copolymers, fluorine rubbers and the like. These polar group-bearing polymers may be used in combination as a blend of two or more. Of these, NBR is preferred in view of the characteristic properties thereof such as a great polarity, a good oil resistance, a good wear resistance and the like.

The organic blowing agent (B) is not critical and includes, for example, azodicarbonamide, 4,4'-oxybisbenzene-sulfonylhydrazide, dinitrosopentamethylenetetramine, p-toluenesulfonylhydrazide, p-toluenesulfonylacetonehydrazide, hydrazinecarbonamide, azobisisobutyronitrile and the like. It will be noted that blowing activators such as lead and zinc compounds, urea, amine compounds and other types of basic compounds may be used in combination for the purpose of controlling the decomposition temperature of the organic blowing agent. The organic blowing agents may be used as a blend of two or more, and may also be used in combination with inorganic blowing agents such as sodium bicarbonate, ammonium carbonate, ammonium bicarbonate and the like.

The content of the organic blowing agent (B) is within a range of 1 to 30 parts by weight per 100 parts by weight of the polymer (A). If the content of the organic blowing agent (B) is smaller than 1 part by weight, a satisfactory degree of foaming cannot be attained, resulting in a hard foam without an intended degree of elasticity. On the other hand, when the content exceeds 30 parts by weight, foaming proceeds in excess with the likelihood that cracking takes place at the time of molding. The decomposition temperature $T_1$ of an organic blowing agent should preferably range from 100 to 210° C. When the temperature is lower than 100° C., there arises a problem of the stability during the course of foaming, and over 210° C., a uniform and satisfactory degree of foaming is unlikely to be obtained.

The organic peroxide (C) is not critical in type and includes, for example, stearoyl peroxide, lauroyl peroxide, benzoyl peroxide, 4-methylbenzoyl peroxide, 1,1-bis(t-butylperoxy)-2-methylcyclohexane, 1,1-bis(t-hexylperoxy)-3,3,5-trimethylcyclohexane, 1,1-bis(t-hexylperoxy)cyclohexane, 1,1-bis(t-butylperoxy)-3,3,5-trimethylcyclohexane, 1,1-bis(t-butylperoxy)cyclohexane, t-hexylperoxyisopropyl monocarbonate, t-butylperoxymaleic acid, t-butylperoxy laurate, t-butylperoxyisopropyl monocarbonate, t-butylperoxy-2-ethylhexyl monocarbonate, t-hexylperoxy benzoate, 2,5-dimethyl-2,5-di(benzoylperoxy)hexane, t-butylperoxy benzoate, n-butyl-4,4'-bis(t-butylperoxy)valeate, di-t-butylperoxy isophthalate, α, α-bis(t-butylperoxy)diisopropylbenzene, dicumyl peroxide, 2,5-dimethyl-2,5-di(t-butylperoxy)hexane, t-butylcumyl peroxide, 2,5-dimethyl-2,5-di(t-butylperoxy)hexine-3 and the like. These organic peroxides may be used as a blend of two or more.

The content of the organic peroxide is in the range of from 0.1 to 10 parts by weight per 100 parts by weight of the polymer (A). If the content of the organic peroxide (c) is less than 0.1 part by weight, a satisfactory degree of crosslinkage cannot be obtained, resulting in inferior elasticity and poor product characteristics such as physical strength and the like. On the other hand, if the content exceeds 10 parts by weight, crosslinkage proceeds in excess, with the possibility of causing cracks to occur in the course of molding. The one minute half time temperature $T_2$ should preferably range from 100 to 210° C. When the temperature is lower than 100° C., there arises a problem of stability at the time of molding, and if the temperature exceeds 210° C., it is unlikely to obtain a satisfactory degree of foaming and crosslinkage throughout a product.

Aside from the above components (A) to (C), ordinarily employed, various formulating ingredients may be added, including, for example, antioxidants, light stabilizers, UV absorbers, processing aids, lubricants, softeners, plasticizers, dehydrators, pigments, inorganic fillers, crosslinking activators, crosslinkage accelerators and the like.

Examples of the inorganic filler include calcium carbonate, magnesium carbonate, alumina, aluminum hydroxide, magnesium hydroxide, mica, xonotlite, precipitated barium sulfate and the like. The average particle size of these fillers should preferably be 10 μm or below in order to obtain homogeneous foaming.

The manner of adding and mixing the respective components and the formulating ingredients is not critical, and any ordinary methods adapted for mixing or kneading resins and rubbers by the use of open type mixing mills, Banbury mixers, pressure kneaders, intermixers, extruders and the like, can be used.

For the foaming of a rubber composition, there may be used any of existing atmospheric foaming techniques, in-mold foaming techniques, press expansion techniques and the like. A preferable foaming method is such that a rubber composition is extrusion molded in a given form, followed by heating and crosslinkage. Heating is feasible by any of a method of circulating hot air of continuously passing through a heating furnace provided with infrared heaters, a method of passing through a bath filled with a molten salt or heated glass beads and the like. Preferably, a crosslinking and expansion or foaming method is used wherein an extruded rubber composition is heated from inside by irradiation with microwaves. Moreover, heating may be carried out by a combination of plural methods mentioned above.

In the method of making a cosmetic applicator according to another embodiment of the invention, there is provided a method wherein at least two rubber formulations are extrusion molded into plural layers and heated to cause an extruded product to be crosslinked and foamed. In this case, the plural rubber compositions may be made of a combination of expandable rubber compositions or a combination with an ordinary non-expandable rubber composition. For the non-expandable rubber composition, a thermoplastic elastomer may be chosen.

According to a further embodiment of the invention, a rubber composition is extrusion molded in a given form and heated and crosslinked to provide an open-cell foam, followed by punching or/and cutting into a desired form, thereby obtaining a shaped rubber foam. Especially, when extrusion molding is performed to provide such a large-sized section that a continuously moldable extrusion section is used as a main surface, followed by punching or/and cutting, it becomes possible to efficiently make an applicator for cosmetics.

In the first to sixth embodiments, a fundamental shape can be readily changed without use of a great number of molds although bases or caps of irregular shapes are changed. In addition, materials for multiple layers having designing properties can be simultaneously formed. Moreover, it is possible to significantly reduce a loss of materials and the number of molding steps, causing low-priced products to be obtained. It is also possible to obtain a wide variety of foam structures (closed cells, semi-closed cells and open cells), the diameter of foams and the hardness, which are suited for the type of cosmetic, depending on the variations of formulating and molding conditions. Additionally, the selection in type of olefinic elastomer enables one to improve the surface quality by use of melt bonding of a spherical resin having similar characteristics.

According to the first to sixth embodiments of the invention, a compounded rubber can be uniformly heated not only at the surface portion, but also at the central portion thereof, thereby obtaining a foam whose cells are uniformly dispersed, even at a large section.

The mass production through extrusion molding is able to realize the supply of a large number of sponge products. This leads to the manufacture of inexpensive applicators for cosmetics.

The manufacture of sponge rods having a large-sized section enables one to make final products by cutting along the section. The portion inevitably wasted at the time of processing includes only a small amount of a skin side surface being removed, with a reduced amount of wastage and also with a reduced burden on the environment.

After vulcanization and molding, the resulting foam is passed through press rolls so that the closed cells partly communicate with each other, thereby improving a feeling to the touch.

According to a seventh embodiment of the invention, the applicator set forth in the first embodiment is obtained by providing an NBR polymer, an organic peroxide and a blowing agent, adding 1 part by weight to 100 parts by weight of a synthetic silicic acid serving as a reinforcing filler to 100 parts by weight of the NBR polymer, heating the compounded rubber as a whole by use of HA heating and UHF heating in combination to cause vulcanization and expansion, thereby providing a thick sponge having a homogenous foam structure, passing through press rolls, and cutting the resulting sheet stock into pieces of a desired form.

Likewise, according to an eighth embodiment of the invention, the applicator set forth in the first embodiment is obtained by providing an NBR polymer, an organic peroxide and a blowing agent, adding 10 parts by weight to 200 parts by weight of precipitated calcium carbonate having a prismatic particle shape and serving as a filler to 100 parts by weight of the NBR polymer, heating the compounded rubber as a whole by use of HA heating and UHF heating in combination to cause vulcanization and expansion, thereby providing a thick sponge having a homogenous cell structure, passing through press rolls, and cutting the resulting sheet stock into pieces of a desired form.

According to a ninth embodiment of the invention, the applicator set forth in the first embodiment is obtained by providing an NBR polymer, an organic peroxide and a blowing agent, adding 1 part by weight to 100 parts by weight of a synthetic silicic acid serving as a reinforcing filler and 10 parts by weight to 200 parts by weight of precipitated calcium carbonate having a prismatic particle shape and serving as a filler, each per 100 parts by weight of the NBR polymer, heating the compounded rubber as a whole by use of HA heating and UHF heating in combination to cause vulcanization and expansion thereby providing a thick sponge having a homogenous cell structure, passing through press rolls, and cutting the resulting sheet stock into pieces of a desired form.

According to a tenth embodiment of the invention, the applicator set forth in any of the embodiments 7 to 9 consists of a sponge puff for cosmetics.

In the practice of the invention, NBR having a swelling resistance against both a powder foundation and a liquid foundation is used as a base material.

Moreover, millable NBR is used, which is capable of forming a sponge, which is more porous than an expanded closed cell sponge rubber sheet, by incorporating therein a crosslinking agent and a blowing agent beforehand, and heating the resulting composition to cause crosslinkage and expansion at the same time.

After the vulcanization and expansion, the rubber is passed through press rolls. The formation of open cells and closed cells can be arbitrarily controlled by controlling how the rubber passes through the press rolls. Moreover, the addition of a synthetic silicic acid within a range of from 1 part by weight to 100 parts by weight per 100 parts by weight of NBR permits easy passage through the press rolls.

UHF (ultra high frequency:microwave) is used for the heating of the rubber composition. Using UHF alone or in combination with HA (hot air), the rubber composition undergoes a uniform heat history throughout the composition, thereby enabling one to form a thick sponge sheet having a uniform foam structure as a whole. Although it has been accepted that EPDM (ethylene propylene rubber), silicone rubbers and the like are unlikely to be heated through UHF as providing a white or colored product, heating through UHF has been found possible when using NBR. For free expansion, a compounded rubber should be preformed by extrusion, thereby providing a uniform internal condition (without inclusion of air in the inside thereof). When vulcanization and expansion is caused by heating, free expansion under conditions of imposing a tension on the rubber may be used, or expansion may be carried out under tension.

Since crosslinkage through an organic peroxide, not through a sulfur crosslinking agent, is performed, discoloration during the use of the final products ascribed to metal ions can be reduced.

When adding not smaller than 25 parts by weight of titanium oxide to 100 parts by weight of NBR in combination with an antioxidant for heat, durability (light discoloration and heat resistance) can be improved.

When using, as a crosslinking agent, two types of peroxides including a low temperature decomposition type and a high temperature decomposition type, optimum timings of vulcanization and expansion can be realized.

If the amount of a synthetic silicic acid is smaller than 1 part by weight, passage through press rolls worsens, disenabling one to conduct a continuous operation. On the other hand, when the amount exceeds 100 parts by weight, the resultant applicator has a significantly increased hardness and thus, becomes unsuitable for use as an applicator for cosmetics. A preferred amount of a synthetic silicic acid from the standpoint of further improving passage through press rolls and imparting an appropriate degree of hardness to the applicator ranges from 3 to 10 parts by weight.

The synthetic silicic acids are illustrated below. The synthetic silicic acids include synthetic silicic acids and synthetic silicates. The synthetic silicic acid also includes anhydrous silicic acid and hydrous silicic acid. The synthetic silicates include hydrous calcium silicate and hydrous aluminum silicate. For improving the property of passage through press rolls, which is one of the purposes of the invention, any synthetic silicic acid may be used irrespective of the shape or form of the particles and whether it is anhydrous or hydrous, and in view of the ease in economic availability, hydrous silicic acid is preferred. Mention is made, as an instance of hydrous silicic acid, of Nipsil VN3 set out in examples appearing hereinafter.

Precipitated calcium carbonate having a prismatic particle shape is illustrated below. Precipitated calcium carbonate includes ground calcium carbonate and precipitated calcium carbonate. The precipitated calcium carbonate includes those having a prismatic particle shape and a spindle shape, respectively. Where ground calcium carbonate or precipitated calcium carbonate having a spindle-shaped particle form is added to NBR as a filler, the degree of homogeneity of the cells becomes poor. In contrast, when precipitated calcium carbonate having a prismatic particle form is added, the degree of homogeneity of the cells is good. For an instance of ground calcium carbonate, mention is made of "Novelight A". An instance of precipitated calcium carbonate having a spindle-shaped particle form includes "Hakuenka CC". Likewise, an instance of precipitated calcium carbonate having a prismatic particle form includes "Tamapearl TP-123".

In the eighth to tenth embodiments, precipitated calcium carbonate having a prismatic particle form should preferably have an average size of 0.1 to 0.3 µm.

The applicators for a cosmetic according to the seventh, ninth and tenth embodiments are those which are obtained by providing an NBR polymer, an organic peroxide, and a blowing agent, adding from 1 part by weight to 100 parts by weight of a synthetic silicic acid per 100 parts by weight of the NBR polymer, heating the compounded rubber as a whole through a combination of HA heating and UHF heating to cause vulcanization and expansion, thereby obtaining a thick sponge sheet of a homogeneous cell state, passing through press rolls and cutting the resulting sheet stock into pieces.

The articles obtained according to the seventh to tenth embodiments of the invention are applicators for cosmetics which are obtained by providing an NBR polymer, an organic peroxide and a blowing agent, adding 1 part by weight to 100 parts by weight of a synthetic silicic acid serving as a reinforcing filler or/and 10 parts by weight to 200 parts by weight of precipitated calcium carbonate having a prismatic particle form and serving as a filler, both per 100 parts by weight of the NBR polymer, heating the resulting compounded rubber as a whole through a combination of HA heating and UHF heating to cause vulcanization and expansion to occur, thereby obtaining a thick sponge sheet of a homogeneous cell state, passing the sheet through press rolls and cutting the resulting sheet stock into pieces. The applicator has a cell structure (water absorption of 5% to 500%) that is intermediate between closed cell and open cell, is unlikely to be soaked with a liquid and is kept with a good feel to the touch. The articles obtained according to the seventh to tenth embodiments of the invention have more coarse cells (with a cell size larger than 100 µm) than a closed-cell applicator (i.e. cell sheet) and are suited to make a thick sponge sheet (30 mm or over) having cells that are substantially uniform.

The disclosures of Japanese Patent Application No. 2003-048851 filed Feb. 26, 2003, No. 2003-084614 filed Mar. 26, 2003, No. 2003-426657 filed Dec. 24, 2003 and No. 2003-430054 filed Dec. 25, 2003 including specification, claims, and drawings, are incorporated herein by reference.

PREFERRED EMBODIMENTS OF THE INVENTION

FIGS. 1A, 1B to 4A, 4B show the first to sixth embodiments of the invention. In these figures, indicated by 5 is a continuous extruder and by 6 is a crosslinking device for carrying out heating and vulcanization. Indicated by 8 is a cutting or punching machine, by 1 is a compounded rubber, by 1a is an extruded material, and by 1b is a vulcanized, expanded rubber foam. A plurality of stock materials 2, 3 may be co-extruded. If a single material is used, a product 4a results. The use of a plurality of stock materials 2, 3 results in a product 4b.

Figure 1:
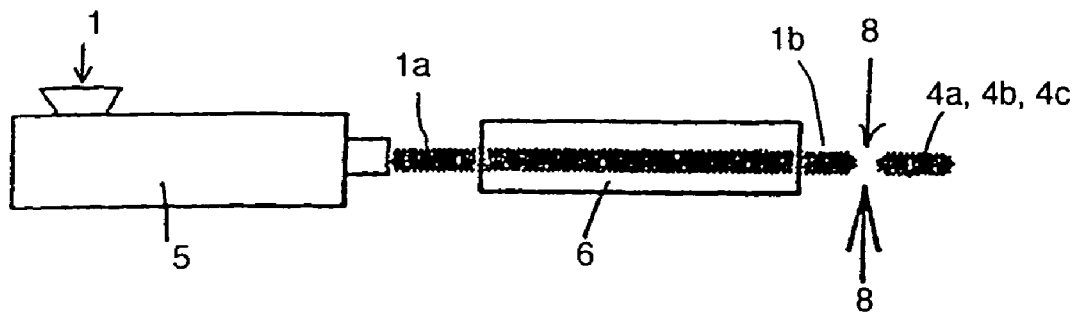
FIG. 1 is a side view showing an apparatus for making a rubber foam material according to the first to sixth embodiments of the invention.
Figure 2:
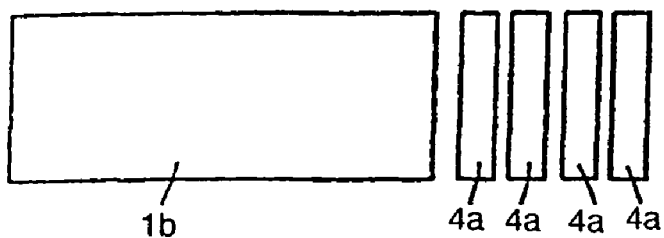
FIGS. 2A and 2B are, respectively, a front view and a side view, both showing an example of an extruded material used in FIG. 1.
Figure 2:
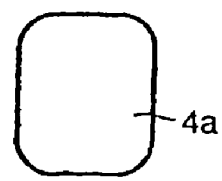
Figure 3:
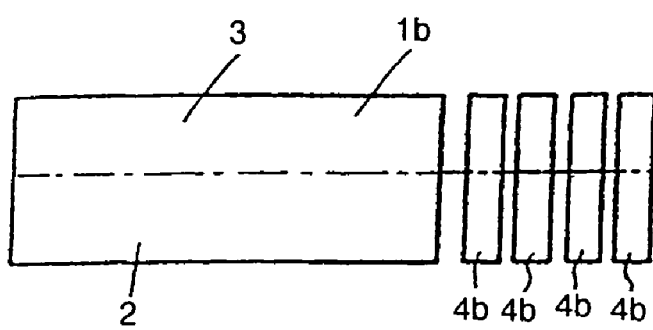
FIGS. 3A and 3B are, respectively, a front view and a side view, both showing another example of an extruded material used in FIG. 1.
Figure 3:
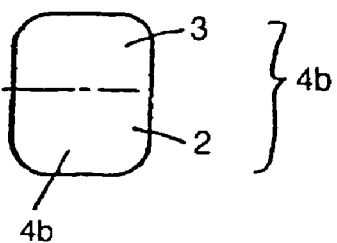
Figure 4:
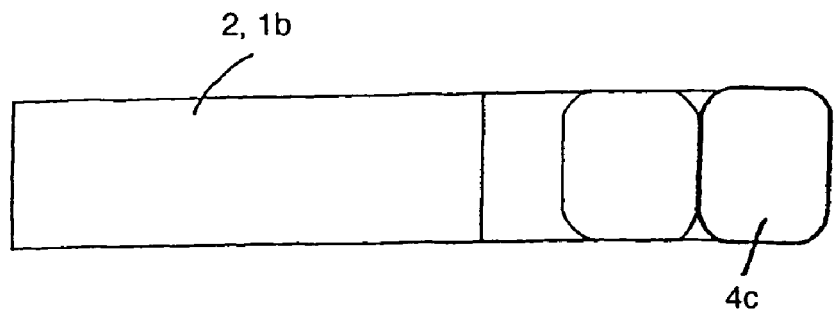
FIGS. 4A and 4B are, respectively, a plan view and a front view, both showing a further example of an extruded material used in FIG. 1.
Figure 4:
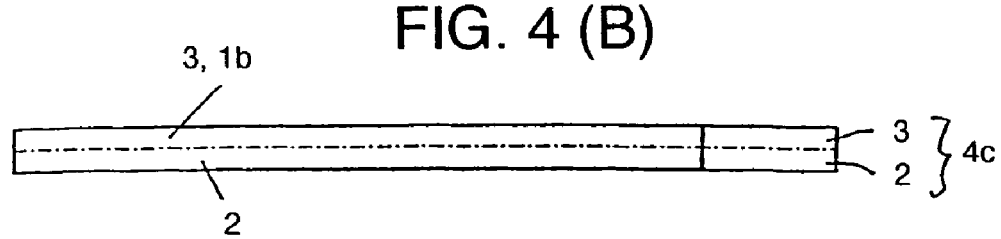
Figure 5:
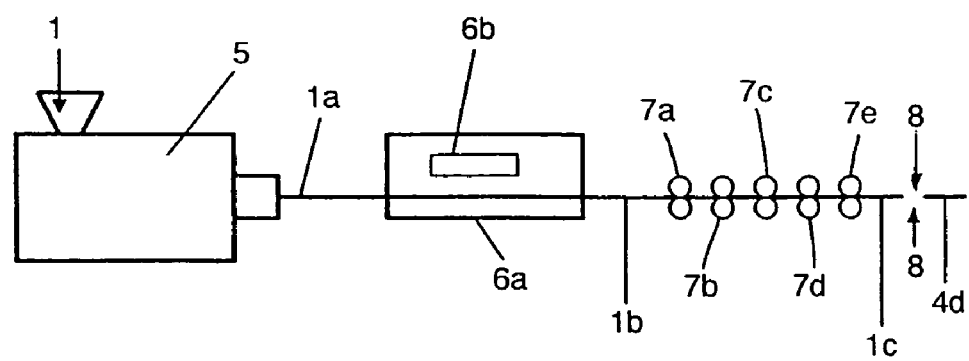
FIG. 5 is a front view showing an example of manufacturing a sponge puff according to the first and seventh to tenth embodiments of the invention.
Figure 6:
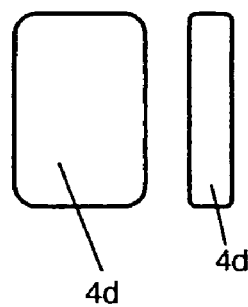
FIGS. 6A and 6B are, respectively, a front view and a side view, both showing an example of a puff obtained from a sheet stock in FIG. 5.
Figure 7:
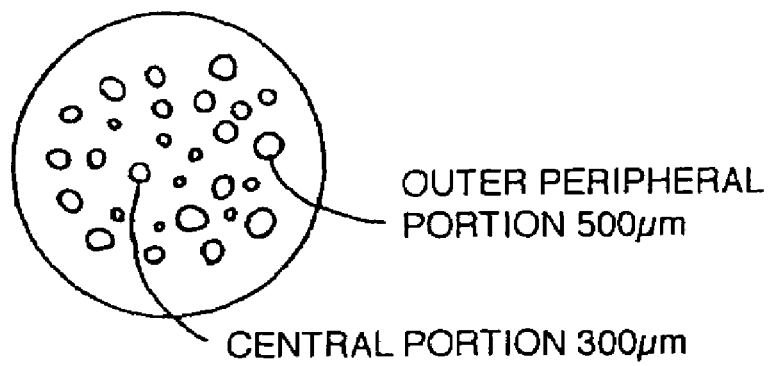
FIGS. 7A, 7B and 7C are, respectively, schematic views showing a sponge puff of FIG. 6 with different degrees of cell homogeneity.
Figure 7:
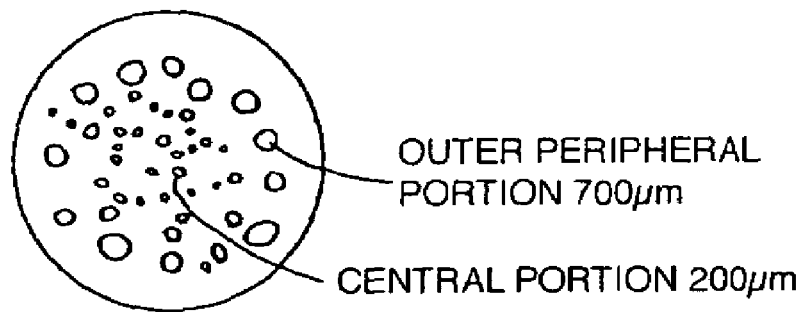
Figure 7:
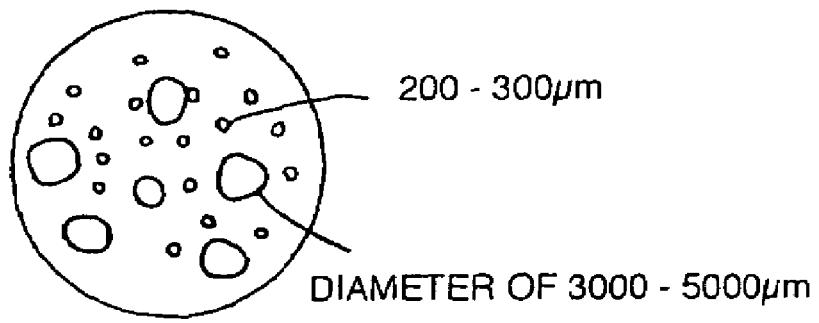

FIGS. 5 to 7 show the first and seventh to tenth embodiments of the invention. In FIG. 5, indicated by 5 is a continuous extruder, by 6a is HA, by 6b is UHF, by 7a to 7e are press rolls, respectively, and by 8 is a cutting or punching machine. The compounded rubber 1 is extruded by means of the continuous extruder 5 to provide an extruded material 1a. This material is heated externally with HA 6a and internally with UHF 6b to provide the vulcanized, expanded rubber 1b, followed by pressing with the press rolls 7a to 7c. The resulting sheet stock is cut by means of the cutting or punching machine 8 to obtain the sponge puff 4c.

Examples of the invention are described, which should not be construed as limiting the invention thereto.

The first to sixth embodiments of the invention are illustrated.

The NBR polymers used in the examples are particularly shown in Table 1 below with respect to the product name, content of acrylonitrile (%), and color tone of vulcanized or crosslinked products in relation to the content

TABLE 1

| Name of Product | Manufacturer | Content of Acrylonitrile | ΔE | Color Tone |
|---|---|---|---|---|
| N220S | JSR Co., Ltd. | 41 | 13.18 | brown |
| N230S | JSR Co., Ltd. | 35 | 6.37 | yellowish brown |
| N240S | JSR Co., Ltd. | 26 | 1.35 | cream color |
| N250S | JSR Co., Ltd. | 20 | 0 | cream color |

Note:
ΔE represents a color difference based on N250S

When the content of acrylonitrile in the NBR polymer used exceeds 30%, the color tone of the vulcanized or crosslinked product turns yellowish brown or brown and visually becomes a dull color as it is. If a pigment is added for coloration, such a dull color apparently remains.

If the content of acrylonitrile in the NBR polymer used is smaller than 5%, the resultant NBR has a low oil resistance and is thus not favorable for practical use as an applicator for cosmetics.

From the foregoing, the content of acrylonitrile in the NBR polymer should preferably be in the range of 5% to 30%. Within this range, the oil resistance is at a level sufficient to present few problems on practical applications, and the vulcanized or crosslinked product assumes a whitish color such as a cream color and is beautiful to the eye on its own. Of course, when pigments are added for coloration, the resulting color can seemingly be fine.

Example 1

| Formulation | Manufacturer | phr |
|---|---|---|
| N230SL (polymer: NBR) | JSR Co., Ltd. | 100 |
| Stearic acid | NOF Corporation | 1 |
| Novelight A (calcium carbonate) | Nitto Funka kogyo Co., Ltd. | 60 |
| R650 (titanium oxide) | Sakai Chem. Ind. Co., Ltd. | 10 |
| DIDP (plasticizer) | Kyowa Hakko Kogyo Co., Ltd. | 10 |
| Perhexa 3M-40 (organic peroxide, crosslinking agent) | NOF corporation | 3.0 |
| Neocellborn N1000S (blowing agent) | Eiwa Chem. Ind. Co., Ltd. | 5.0 |
| VESTA-18 (dehydrator) | Inoue Sekkai Co., Ltd. | 5.0 |

<Preforming>
Extruded with Φ50 rubber extruder
Section: 85 × 25 (mm) length: 150 (mm)
<Vulcanization and foaming>
HA: 200° C.
UHF: 0.5 kw
Heating time: 3.5 minutes
<Sponge size>
Foamed product size: 70 × 45 × 230

Example 2

Two rolls were set at a roll clearance of 10 mm, and while the foamed product obtained in Example 1 was passed, the roll clearance was gradually reduced. The press rolling was completed just before the sponge sheet was crushed.

The water absorption after the breakage of a part of the closed cells was found to be 83%.

TABLE 2

| | Example 1 Inventive sponge puff | Example 2 Inventive sponge puff | Comp. Ex. 1 Sponge puff from latex | Comp. Ex. 2 Sponge puff of EDM closed cell |
|---|---|---|---|---|
| Cell structure | Semi-open cells (water absorption: 12%) | Semi-open cells (water absorption: 12%) | Open cells alone | Closed cells alone |
| Apparent density (g/cm³) | 0.19 | 0.18 | 0.1 to 0.2 | 0.1 to 0.2 |
| Compression load at 25% (kPa) | 28 | 10 | 5 to 10 | 20 to 25 |
| Tensile strength (kPa) | 400 | 380 | 50 to 100 | 300 to 500 |
| Elongation (%) | 350 | 360 | 200 to 300 | 300 to 500 |
| Light fastness | Δ-○ | Δ-○ | Δ-X | ○ |
| Resistance to metal ion | ○ | ○ | Δ-X | ○ |
| Make-up property & texture | Δ-○ | ○ | ○ | Δ-○ |
| Oil resistance | ○ | ○ | ○ | ○ |

In Table 2, ○ = good, Δ = moderate, X = poor

The light fastness and the resistance to metal ions were evaluated in terms of color change.

Examples directed to the eighth to eleventh embodiments of the invention are now described.

The rubber formulations are shown in Table 3 below.

TABLE 3

| | | Parts by weight | | | | |
|---|---|---|---|---|---|---|
| Product Name | Manufacturer | Ex. 3 | Ex. 4 | Ex. 5 | Comp. Ex. 3 | Comp. Ex. 4 |
| NBR polymer N240S *1 | JSR Co., Ltd. | 100 | 100 | 100 | 100 | 100 |
| Stearic acid | NOF Corp. | 1 | 1 | 1 | 1 | 1 |
| PEG#4000 | NOF Corp. | 1 | 1 | 1 | 1 | 1 |
| Nipsil VN3 *2 | Nippon Silica Co., Ltd. | 5 | 0 | 5 | 0 | 0 |
| Novelight A | Nitto Funka Ind. Co., Ltd. | 72 | 0 | 0 | 72 | 0 |
| Tamapearl TP-123 | Okutama Ind, Co., Ltd. | 0 | 72 | 72 | 0 | 0 |
| Hakuenka CC | Shiraishi Corp. | 0 | 0 | 0 | 0 | 72 |
| R-650 | Sakai Chem. Ind. Co., Ltd. | 26 | 26 | 26 | 26 | 26 |
| Nocrac | Ouchishinko Chemical Industrial Co., Ltd. | 1 | 1 | 1 | 1 | 1 |

TABLE 3-continued

| | | Parts by weight | | | | |
|---|---|---|---|---|---|---|
| Product Name | Manufacturer | Ex. 3 | Ex. 4 | Ex. 5 | Comp. Ex. 3 | Comp. Ex. 4 |
| DIDP | Kyowa Hakko Kogyo Co., Ltd. | 20 | 20 | 20 | 20 | 20 |
| Nyper BW *3 | NOF Corp. | 2.5 | 2.5 | 2.5 | 2.5 | 2.5 |
| Perhexa 25B-40 *4 | NOF Corp. | 2.5 | 2.5 | 2.5 | 2.5 | 2.5 |
| Neocellborn N1000S *5 | Eiwa Chemical Ind. Co., Ltd. | 5.0 | 5.0 | 5.0 | 5.0 | 5.0 |
| VESTA-18 | Inoue Sekkai Ind. Co., Ltd. | 5.0 | 5.0 | 5.0 | 5.0 | 5.0 |

Note
*1: NBR polymer
*2: white filler
*3: low temperature crosslinking agent
*4: high temperature crosslinking agent
*5: blowing agent The compounded rubbers indicated in Table 3 were each extruded by means of a rubber extrude with Φ50 to obtain non-vulcanized rubber rod bodies having a section of 30×25 mm and a length of 150 mm.

The unvulcanized rubber rod body was heated under load-free conditions of HA temperature=200° C. and UHF output power=0.5 kw to cause vulcanization and expansion to provide a vulcanized sponge rubber rod body with a size of 70×45×230 mm.

Each vulcanized sponge rubber rod body was passed n times through biaxial rolls having a clearance of 3 mm to allow uniform passage throughout the body thereby providing a sponge rubber sheet stock.

The results of the comparison of the sponge rubber sheet stocks of Examples 3, 4 and 5, the sponge rubber sheet stocks of Comparative Examples 3 and 4, and the known latex puff (L×puff) (Comparative Example 5) and the closed cell puff (Comparative Example 6) are shown in Table 4 below. Examples 3, 4 and 5 and Comparative Examples 3 and 4 were carried out under the same manufacturing conditions except for the number of roll passes.

TABLE 4

| Measured Items | Units | Ex. 3 | Ex. 4 | Ex. 5 | Comp. Ex. 3 | Comp. Ex. 4 | Comp. Ex. 5 L × puff | Comp. Ex. 6 Closed-cell puff |
|---|---|---|---|---|---|---|---|---|
| Roll pass | Number | 5 | 20 | 5 | 20 | 20 | — | — |
| Water absorption | % | 370 | 290 | 450 | 300 | 300 | 500 to 600 | 3 to 5 |
| Apparent density | g/cm$^3$ | 0.17 | 0.16 | 0.16 | 0.16 | 0.16 | 0.1 to 0.2 | 0.1 to 0.3 |
| Compression load at 25% | KPa | 21 | 17 | 19 | 18 | 20 | 5 to 10 | 20 to 25 |
| Tensile Strength | KPa | 420 | 310 | 450 | 300 | 330 | 60 to 100 | 300 to 500 |
| Elongation | % | 300 | 290 | 310 | 300 | 320 | 200 to 300 | 300 to 500 |
| Light discoloration | — | Δ-○ | Δ-○ | Δ-○ | Δ-○ | Δ-○ | Δ-X | ○ |
| Resistance to metalion | — | ○ | ○ | ○ | ○ | ○ | Δ-X | ○ |
| Oil resistance | — | ○ | ○ | ○ | ○ | ○ | ○ | X |
| Makeup property | — | Δ-○ | Δ-○ | Δ-○ | Δ-○ | Δ-○ | ○ | Δ-X |
| Sufficiency of roll pass for imparting desired cell structure | — | ○ | Δ | ○ | Δ | Δ | — | X |
| Homogeneity of cells | — | Δ | ○ | ○ | Δ | Δ | ○ | ○ |

As to the light fastness, resistance to metal ions, oil resistance and makeup property, ○ = good, Δ = moderate and X = poor.

In Table 4, the roll pass sufficiency for a sample subjected to 1 to 15 roll passes is indicated as "○", the sufficiency for a sample subjected to 15 to 30 passes is indicated as "Δ", and the occurrence of a phenomenon such as breakage of a sample sheet, i.e. impracticability of roll pass, is indicated as "x".

In Table 4, the homogeneity of the cells is determined such that when a sponge rubber sample of each of the examples and comparative examples was observed through an electron microscope, those samples having a cell diameter of 300 μm at the central portion thereof and a cell diameter of 500 μm at the outer periphery thereof are indicated as "○" (FIG. 7(A)). With the symbol "○", the diameters of substantially all of the cells existing in a sample are within a range of three times an average cell diameter and thus, the sample is most suited for cosmetic service.

Those samples having a cell diameter of 200 μm at the central portion thereof and a cell diameter of 700 μm at the outer periphery are indicated as "Δ" (FIG. 7(B)). With the symbol "Δ", the number of cells having diameters that are over a range of three times an average diameter of cells existing in a sample exist, and this sample is suited for cosmetic service.

It will be noted that those samples having a cell diameter of 200 to 300 μm at the central portion thereof and a cell diameter of 3000 to 5000 μm at the outer periphery (FIG. 7(C)) are such that the number of cells having diameters that are over a range of ten times an average cell diameter exist and thus, are not suited for cosmetic service.

From Table 4, it will be seen that the products of the invention can be appropriately used for powder foundation and liquid foundation.

What is claimed is:

1. A process for preparing an extrusion-molded foamed cosmetic sponge puff comprising the steps of:
    forming a rubber compound from a NBR polymer, an organic peroxide, a blowing agent and a synthetic silicic acid as a reinforcing filler and aid for permitting easy passage through press rolls in an amount of 3 to 10 parts by weight per 100 parts by weight of the NBR polymer;
    extrusion-molding the rubber compound to form an extrusion-molded rubber;
    heating the extrusion-molded rubber by a combination of hot air and ultra high-frequency heating to cause crosslinking and expansion of the extrusion-molded rubber to provide a thickened sponge having a homogeneous cell structure containing closed cells;
    passing the thickened sponge through the press rolls to cause the closed cells to partly communicate with each other and form a resultant sheet stock; and
    cutting the resultant sheet stock into cosmetic sponge puffs of a desired form,
    wherein the cosmetic sponge puff has an intermediate cell structure in which closed cells partially communicate with each other and the cosmetic sponge puff has a water absorption of 5-500%.

2. The process of claim 1, wherein the sponge puff is made from at least two compounded rubbers.

3. The process of claim 1, wherein the cells have a diameter of 300 μm at a central portion thereof and a cell diameter of 500 μm at an outer periphery thereof.

4. A process for preparing an extrusion-molded foamed cosmetic sponge puff comprising the steps of:
    forming a rubber compound from a NBR polymer, an organic peroxide, a blowing agent, a synthetic silicic acid as a reinforcing filler and aid for permitting easy passage through press rolls in an amount of 3 to 10 parts by weight per 100 parts by weight of the NBR polymer and precipitated calcium carbonate having a prismatic particle shape as a filler in an amount of 10 to 200 parts by weight per 100 parts by weight of the NBR polymer;
    extrusion-molding the rubber compound to form an extrusion-molded rubber;
    heating the extrusion-molded rubber by a combination of hot air and ultra high-frequency heating to cause crosslinking and expansion of the extrusion-molded rubber to provide a thickened sponge having a homogeneous cell structure containing closed cells;
    passing the thickened sponge through the press rolls to cause the closed cells to partly communicate with each other and form a resultant sheet stock; and
    cutting the resultant sheet stock into cosmetic sponge puffs of a desired form,
    wherein the cosmetic sponge puff has an intermediate cell structure in which closed cells partially communicate with each other and the cosmetic sponge puff has a water absorption of 5-500%.

5. The process of claim 4, wherein the sponge puff is made from at least two compounded rubbers.

6. The process of claim 4, wherein the cells have a diameter of 300 μm at a central portion thereof and a cell diameter of 500 μm at an outer periphery thereof.

* * * * *